Jan. 21, 1936.  J. E. REDFORD  2,028,623
BRAKE RIGGING
Filed June 3, 1933   2 Sheets-Sheet 2
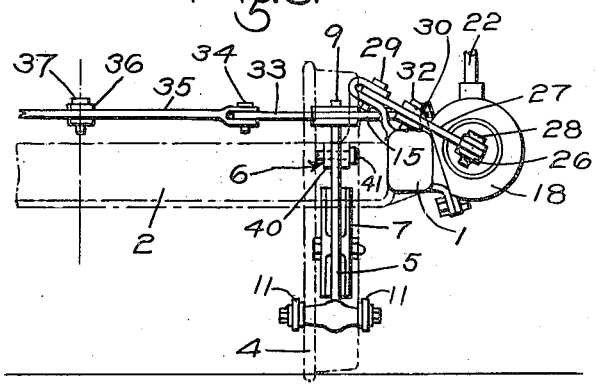
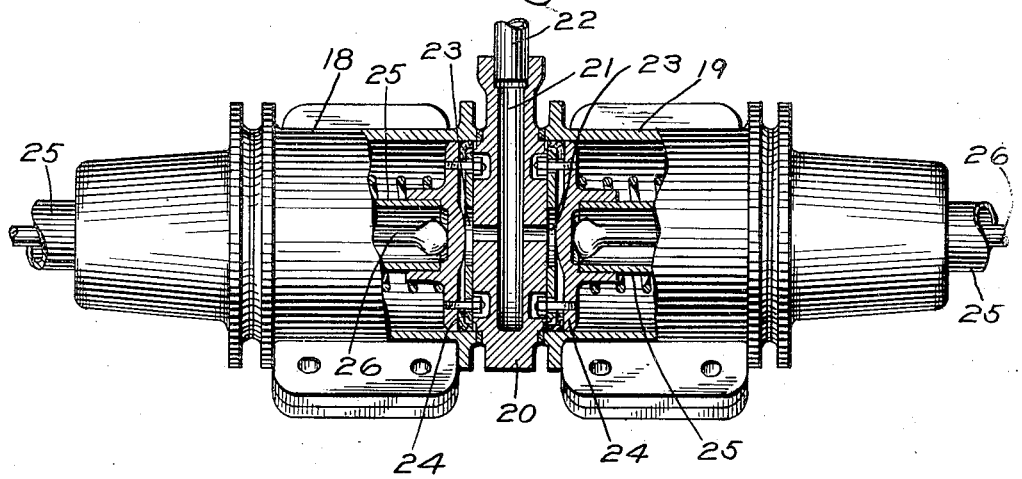
INVENTOR
JOHN E. REDFORD
BY  *Wm. M. Cady*
ATTORNEY Patented Jan. 21, 1936

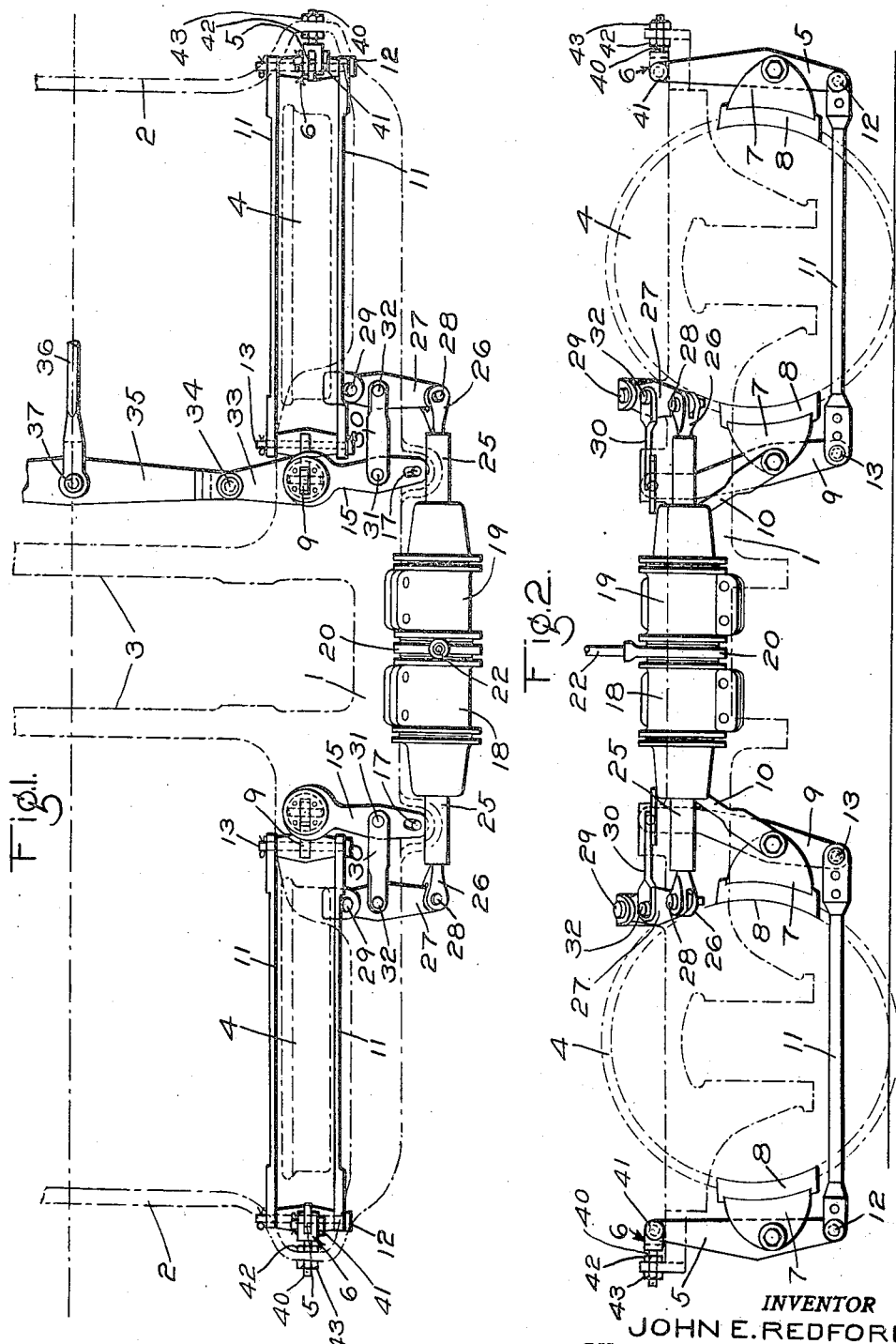

2,028,623

UNITED STATES PATENT OFFICE 2,028,623

BRAKE RIGGING

John E. Redford, Florissant, Mo., assignor to The American Brake Company, St. Louis, Mo., a corporation of Missouri Application June 3, 1933, Serial No. 674,207

4 Claims. (Cl. 188—56)

This invention relates to brake rigging for use on railway car trucks and has particular reference to that type of brake rigging in which the brake cylinders are carried by the truck frame.

An object of the invention is to provide a very compact and simple brake rigging for railway car trucks, wherein, for each truck wheel, there is a brake cylinder and a novel brake linkage of the clasp type mounted on the truck frame.

Other objects and advantages will appear in the following more detailed description of the invention.

In the accompanying drawings, Fig. 1 is a fragmentary top plan view of a railway car truck equipped with my improved brake rigging; Fig. 2 is a side elevational view of the car truck shown in Fig. 1; Fig. 3 is a fragmentary view in end elevation of the truck; and Fig. 4 is an enlarged side elevational view of the brake cylinder assembly, portions of the brake cylinder casings being broken away to more clearly illustrate one feature of the invention.

For illustrative purposes only the car truck has been shown as comprising a cast metal truck frame comprising spaced side members 1 which are integrally connected together by end members 2 and spaced transoms 3, only one of the side members being shown. The truck frame is carried by wheels 4 in the usual manner.

The brake rigging at one side of the truck frame is of substantially the same construction as that at the other side of the truck frame, and for this reason, the following description will be limited to the brake rigging at one side of the truck frame.

Located at one side of one of the wheels 4 is a vertically disposed dead lever 5 which at its upper end is pivotally connected to the truck frame through the medium of a slack adjuster 6 and which has connection, intermediate its ends, with a brake head 7 carrying a brake shoe 8 for braking engagement with the tread of the wheel.

Located at the other side of this same wheel is a vertically disposed live lever 9 which is operatively supported from the truck frame by the usual spaced hangers 10 which are pivotally connected at their upper ends to the truck frame in any desired manner. Intermediate its ends this lever has pivotal connection with a brake head 7 carrying a brake shoe 8 for braking engagement with the tread of the wheel.

Positioned on opposite sides of the wheel are brake rods 11 which are pivotally connected to the lower end of the dead lever 5 by a pin 12 and to the lower end of the live lever 9 by a pin 13.

The upper end of the live lever 9 is pivotally connected to the inner end of a horizontally disposed intermediate lever 15, the outer end of said lever being pivotally connected to the side member 1 of the truck frame by means of a pin 17, said outer end of the lever being provided with a slot through which the pin 17 passes, so that a slight movement of the lever in the direction of its length relative to the pin 17 is permitted.

Located between the ends of the truck frame and secured to the side member thereof is a brake cylinder assembly comprising brake cylinders 18 and 19 which are arranged in axial alignment and which have secured thereto a member 20 which serves as a pressure head for each brake cylinder, said member being provided with a passage 21 leading from a brake cylinder pipe 22 to the pressure chambers 23 at the pressure side of the brake cylinder pistons 24 which are operatively mounted in the brake cylinders.

Each brake cylinder piston 24 is provided with the usual hollow stem 25 in which a push rod 26 is mounted in the usual well known manner.

The outer end of the push rod 26 of the brake cylinder 18 is pivotally connected to the outer end of a brake cylinder lever 27 by means of a pin 28, the inner end of which lever is pivotally connected to the truck frame by means of a pin 29.

The levers 27 and 15 are operatively connected, intermediate their ends, by means of a pair of short pull rods 30, the rods being pivotally connected to the lever 15 by a pin 31, and to the lever 27 by a pin 32.

The brake linkage for the other wheel 4 differs in only one respect from the linkage just described and that is that the lever 15 is provided with an extension 33 which is pivotally connected, by means of a pin 34 to the adjacent end of a horizontally disposed equalizer bar 35. A hand brake pull rod 36 is operatively connected by means of a pin 37 to the equalizing bar 35. The other end of the equalizing bar is operatively connected to the brake linkage (not shown) at the other side of the truck.

The slack adjuster 6 hereinbefore mentioned may be of any desired type but for illustrative purposes only has been shown as comprising a member 40 which is adjustably carried by the truck frame. The upper end of the dead lever 5 is pivotally anchored to the inner end of the member 40 by a pin 41. For the purpose of varying the position of the member 40, nuts 42 and 43 are provided which have screw-threaded engagement with the member and which are adapted to engage opposite sides of a portion of the truck frame. By slacking off the nut 42 and turning the nut 43 in a clockwise direction, the member 40 and upper end of the dead lever 5 will be moved in a direction toward the end of the truck frame and by slackening off the nut 43 and turning the nut 42 in a clockwise direction the member 40 and upper end of the dead lever will be moved in a direction away from the end of the truck frame, thus it is possible to take up the slack in each brake rigging.

From the foregoing description it will be understood that I have provided a unit clasp brake arrangement including connected dead and live levers, two operatively connected intermediate levers for operating said live lever and a brake cylinder mounted on the side member 1 of the truck frame operative to control the operation of the connected intermediate levers.

To effect an application of the brakes, fluid under pressure is supplied by way of pipe 22 and passage 21 to the pressure chambers 23 of the brake cylinders 18 and 19, causing the pistons 24 and push rods 26 to move outwardly, that is to say, in directions away from each other. As each push rod is thus moved, the brake linkage connected thereto operates to move the brake shoes 8 into braking engagement with the tread of an adjacent wheel 4.

Due to the brake cylinders 18 and 19 being secured together, they may be mounted on the side member of the truck frame as a unit in a better manner to meet all clearance conditions and service requirements than is possible where the brake cylinders are separate from each other and positioned one at each end of the side member of the truck frame. Another advantage of this unitary construction is that only one brake cylinder pipe is required for both brake cylinders.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake rigging, the combination with a railway car truck comprising a truck frame and a plurality of wheels, of a clasp brake rigging associated with each wheel comprising operatively connected truck levers located on the respective sides of a wheel, a dead lever pivotally mounted on the truck frame adjacent the transverse center line of the plane and operatively connected to one of said truck levers, and a cylinder lever pivotally mounted on the truck frame in close proximity with said dead lever and operatively connected with said dead lever, and a brake cylinder device disposed between the two cylinder levers at one side of the truck and secured to the truck frame adapted to actuate said two cylinder levers.

2. In a brake rigging, the combination with a railway car truck comprising a truck frame and a plurality of wheels, of a clasp brake rigging associated with each wheel comprising a dead truck lever located on one side of an adjacent wheel, a live truck lever located on the other side of said adjacent wheel, means operatively connecting said dead and live truck levers, a lever for actuating said live truck lever and a cylinder lever for actuating the last mentioned lever, and a brake cylinder device located between two clasp brake riggings at one side of the truck and operable to actuate the cylinder levers of said brake riggings.

3. In a brake rigging, the combination with a railway car truck comprising a truck frame and a plurality of wheels, of a clasp brake rigging associated with each wheel comprising a dead truck lever located on one side of an adjacent wheel, a live truck lever located on the other side of said adjacent wheel, means operatively connecting said dead and live truck levers, a horizontally disposed lever for actuating said live truck lever pivotally and slidably connected at its outer end to the truck frame and pivotally but otherwise rigidly connected at its inner end to the live truck lever, a cylinder lever pivotally connected at its inner end to the truck frame and operatively connected intermediate its ends to said horizontally disposed lever, and a brake cylinder device mounted on the truck frame between two clasp brake riggings at one side of the truck and operable to actuate the cylinder levers of the brake rigging associated with two of said wheels at one side of the truck.

4. In a brake rigging, the combination with a railway car truck comprising a truck frame and a plurality of wheels, of a clasp brake rigging associated with each wheel comprising a dead truck lever located on one side of an adjacent wheel, a live truck lever located on the other side of said adjacent wheel, means operatively connecting said dead and live truck levers, a horizontally disposed lever for actuating said live truck lever pivotally and slidably connected to the truck frame and pivotally but otherwise rigidly connected to the live truck lever, a cylinder lever pivotally connected to the truck frame and operatively connected to said horizontally disposed lever, a brake cylinder device for actuating said cylinder lever, and a hand brake mechanism comprising a bar extending transversely of the truck frame and operatively connected at its outer ends to the inner ends of the horizontally disposed levers of two oppositely disposed brake riggings for actuating said brake riggings.

JOHN E. REDFORD.